United States Patent Office 3,322,545
Patented May 30, 1967

3,322,545
METHOD OF MAKING AND ADJUSTING THE COLOR OF A POWDERED FOOD PRODUCT
Arthur E. Siehrs, Chicago, Ill., assignor to Krim-Ko Corporation, a corporation of Illinois
No Drawing. Filed Jan. 7, 1966, Ser. No. 519,303
10 Claims. (Cl. 99—148)

This application is a continuation-in-part of my copending application Ser. No. 414,002, entitled "Method of Making a Food Product" and filed Nov. 25, 1964.

This invention relates to a method of providing controlled or adjusted use color to a water soluble powdered feed product which is intended for use by dissolution in an aqueous medium, and especially where such product is colored by a water soluble dye. This invention also relates to a method of imparting a desired shade and depth or intensity of color to such a powdered food product. Further, this invention relates to powdered food products made by such method.

The product of this invention can be considered as a concentrate which is capable of being mixed with an aqueous liquid to produce a liquid food product. The product has many other food uses such as for decorating cakes, cookies, ice cream, and the like, by sprinkling the product thereon, for example.

As pointed out in my copending application Ser. No. 414,002, many liquid food products are prepared by mixing a powdered concentrate in an edible liquid such as milk. These concentrates customarily contain a soluble color constituent which dissolves in the liquid to impart a desired color in use dilution or solution, i.e. in the final liquid food product. Such powdered concentrate can also be used as a colored sugar concentrate condiment which can be sprinkled on cereal or other edible food products to impart sweetness and color to the product.

The customary powdered concentrate has, in the past, been of a color which is not pleasing to the eye and which is completely different from the color of the use dilution in the final liquid food product. Since the concentrates are often marketed in transparent glass or plastic containers where the color can be observed, it is highly desirable for consumer acceptance that the color of the powdered concentrate be close to that of the final use product. My copending application presents one method of darkening or increasing the color intensity of a powder which normally is of a color much lighter than that of the use product.

In many uses of the powdered concentrates, e.g. for addition to cereal or the like, it is not always desirable that the color completely color the solution within the normal time for consumption of the food product. For example, in use with cereal, it may be desired to merely speckle the cereal with color and/or provide slow dissolution of the color into the milk during consumption of the cereal. Thus, it is desirable to control the solubility of the color component of the powdered concentrate.

In some instances, the color in a dry concentrate may be too intense for consumer acceptability, e.g. due to employment of a method for intensifying the color. It is therefore also desirable to mask or decrease the color intensity of the dry concentrate in addition to decreasing the intensity of the color in the use dilution or solution.

One of the features of this invention is to provide an improved method of adjusting or controlling the shade or depth of color of a powdered food concentrate so that the powder will have a pleasing appearance. In one aspect of the invention, the powder can have substantially the same shade and depth of color as the final liquid food product. In another aspect of the invention, the powder can have controlled color solubility such as to create more pleasing color effects in a liquid food product during use.

Other features, aspects and advantages of the invention will be apparent from the following description and the representative embodiments thereof.

The powdered concentrate of this invention is mixed with an aqueous liquid to produce a final liquid product. The aqueous liquid is frequently milk, cream, or the like, for example. In order to give the desired color to the liquid food, a water soluble dye is present in the powdered concentrate, and the powdered concentrate will usually include sugar which is preferably coagglomerated with the dye. According to the present invention, the powdered concentrate also includes a water insoluble masking agent which functions to mask the color, i.e. decrease its intensity, in the powdered concentrate.

In a preferred form of the invention, part of the masking function of the masking agent is to decrease the solubility of the color in the liquid food product. Where the liquid food product is an agglomerate, the masking agent is coagglomerated with the dye and any other ingredient such as sugar.

In the preferred concentrate, the water soluble dye is present in an amount of from about 0.01 to 0.20% by weight of the concentrate powder. These proportions and percentages will, of course, vary, depending on the type of dye used, the nature of the powdered concentrate, the liquid that is used and the color which is desired in the final food product. Thus, the above proportions and percentages are only exemplary and are not controlling.

The water insoluble masking agent is present in an amount sufficient to mask the color in the concentrated food product to the desired color intensity. Such amount may vary from between .001 and 5% by weight but, in the preferred form, will more usually be in the range of .01 to 1% by weight of the total concentrate. Although any edible insoluble material can be used in such small amounts in the concentrate, the preferred materials are the edible alkaline earth metal soaps such as calcium or magnesium stearate. The masking agents are of the film-forming type, although it has not been ascertained that films are formed in the present products. The specific examples of the masking agents and their amounts of use are exemplary and are not controlling since other such agents can be used in different amounts. Although the masking agents are described as water insoluble, they often have very limited solubility in water, e.g. up to .01 gram/ml. of water, or higher. Calcium and magnesium stearate are preferred because of their limited solubility, their edibility and their tastelessness.

An example of a process and apparatus for producing colored food product concentrates in agglomerated pulverulent form is disclosed in U.S. Patent 2,995,773. According to the process, the agglomerates are contacted with superheated vapor such as steam during their formation. The steam is sufficient to wet the powder and cause agglomeration. A semi-diagrammatic showing of the process is given in FIGURE 4 of that patent. The agglomerates are then dried to a powder form. In making the agglomerates of the present invention, the masking agent is introduced into the powder feed containing the dye substance, e.g. into a mixture of sugar and dye. The superheated vapor is then introduced and, after drying, the masking agent is sufficiently dispersed throughout the product to decrease the solubility of the dye in an aqueous medium. It is believed that, where the preferred masking agents are used, at least a portion of the masking agent is melted or partially melted by the superheated steam and forms an edible film associated with the dye in such manner as to decrease its solubility.

In a preferred form of the process, during the treatment with superheated steam, the amount of moisture introduced is controlled in the manner set out in my copending application Ser. No. 414,002 such that the moisture level in the gaseous mixture which is forced transversely through the stream of powder is about 0.23 to 0.50%. Such control provides a preselectable increased intensity and depth of color according to the amount of activating moisture.

The following examples illustrate the method of this invention.

*Examples 1–3*

The following ingredients are mixed:

| | Percent |
|---|---|
| Artificial strawberry flavoring | 0.32 |
| Lactose | 10.0 |
| Dyes: Red #2—0.015%, Red #4—0.0525% | 0.0675 |
| Salt | 0.4 |
| Sugar | 89.2 |

The resulting powder is mixed with the following amounts of calcium stearate as indicated for each example:

| Example: | Percent calcium stearate |
|---|---|
| 1 | 0.5 |
| 2 | 0.25 |
| 3 | 0.125 |

The mixture is treated with air containing 0.36% moisture by forcing the air through a loose bed of the powder to form agglomerates. The moisture activates the water soluble coloring dyes to give a rich red color to the concentrate, which activation is partially masked by the calcium stearate such that the color of Example 3 is the most intense and that of Example 1 is the least intense. When sprinkled in normal use amount on a mixture of corn flakes and milk in a bowl, the powdered material of each example dissolves in the milk at a different rate and at a rate slower than a control experiment prepared in the same manner as the three examples except that the calcium stearate is omitted. In the case of Example 1, only a very small amount of the agglomerate dissolves in the milk, so that the concentrate contributes very little to the color or the flavor of the milk, and the color and flavor is all concentrated in a solid shape on the corn flakes. In the case of Example 2, about 10 to 15% of the agglomerate dissolves in the milk during the normal eating time for the bowl of corn flakes; thus, about 10 to 15% of the color and flavor is released to the milk. In the case of Example 3, 25 to 30% solubility of the agglomerate is obtained. Where no calcium stearate is included, the powdered food product almost instantaneously forms a complete solution in the milk upon contact. Further experiments regulating the amount of calcium stearate between .01 and .1% indicate increased solubility with decreased calcium stearate content.

*Examples 4–6*

The procedure of Examples 1–3 is repeated using the following powder mix:

| | Percent |
|---|---|
| Dried Bananas | 2.5 |
| Flavoring | 0.25 |
| Lactose | 10.0 |
| Dye—Yellow #5 | 0.04 |
| Sugar | 87.2 | and the following amounts of magnesium stearate:

| Example: | Percent magnesium stearate |
|---|---|
| 4 | 0.5 |
| 5 | 0.25 |
| 6 | 0.125 |

The resulting agglomerates of Examples 4–6 behave in the same manner with respect to solubility as those of Examples 1–3, respectively, except that the color is yellow. The increased color masking with increased amounts of magnesium stearate is also noticeable.

*Examples 7–9*

The procedure of Examples 1–3 is repeated except that the moisture content of the air is about 0.15%. The resulting dry agglomerates have less intense color than their counterparts of Examples 1–3, but they behave similar to their counterparts after contact with the milk in a mixture of corn flakes and milk in a bowl.

In the above examples the various dyes are identified as follows:

Yellow #5—sodium salt of 4-p-sulphobenzene-azo-1-p-sulphophenyl-5-hydroxypyrazol-3-carboxylic acid Red #2—sodium salt of 4-sulpho-a-naphthalene-azo-b-naphthol-3:6-disulphonic acid Red #4—$C_{18}H_{11}O_7N_2Na_2S_2$ These are only examples of water soluble dyes, as it is well understood that there are many such dyes, e.g. Yellow #6 ($C_{16}H_{10}O_7N_2S_2Na_2$), that are used widely in such type of food products.

Having described my invention as related to the embodiments set out herein, it is my intention that the invention be not limited by any of the details of description, unless otherwise specified, but rather be construed broadly within its spirit and scope as set out in the accompanying claims.

I claim:

1. The method for adjusting the color intensity of a water soluble dye in a soluble powdered food product concentrate intended for use by dissolving in an aqueous medium to produce a colored liquid food product, which method comprises admixing a dry mix of particles containing said dye, treating said dry mix with water insoluble color masking material, and agglomerating the treated mix, said masking material being present in a proper amount for imparting the desired decreased color intensity to the particles.

2. The method of claim 1 wherein said color masking material is an alkaline earth metal stearate.

3. The method of claim 2 wherein said alkaline earth metal is selected from the class consisting of calcium and magnesium.

4. The method of claim 3 which includes the step of preparing a water soluble solid food product having the desired color in greater than desired intensity and wherein said treating step comprises mixing and agglomerating the food product with an amount of the stearate to decrease the color intensity to the desired level in the resulting agglomerates.

5. The method of claim 4 wherein said preparing, mixing and agglomerating steps comprise mixing sugar and sufficient dye to provide said greater intensity, mixing said amount of stearate, and subjecting the mixture to superheated steam to introduce a sufficient amount of water to agglomerate the mixture, and air-drying the resulting agglomerates.

6. The method of claim 1 wherein the dye content of the powdered food product is in an excess over the amount providing proper color to the liquid food product in dilution use and the amount of masking material is in an amount imparting proper insolubility to said dye for balancing said excess dye content.

7. The powdered food product prepared by the method of claim 1.

8. The powdered food product prepared by the method of claim 6.

9. The method of claim 1 including the steps of (1) preparing said particles by incorporating in the powdered food product a water soluble dye in an amount to give a desired color to the liquid food product, and (2) adding sufficient moisture to the dyed particles to activate a portion only of said dye to give a color to said powdered food product of greater intensity than said desired color intensity prior to said treating step.

10. The method of adjusting the use solution color intensity of a soluble powdered food product concentrate containing a water soluble dye and intended for use by dissolving in an aqueous medium, which method comprises mixing and agglomerating particles of the powdered food product and said dye in non-aqueous form with from about .01 to about 1 weight percent of a water insoluble edible material for regulating the solubility of said dye during solution use in the aqueous medium to provide a desired solution color intensity.

References Cited

UNITED STATES PATENTS 3,116,150  12/1963  Baker _____ 99—143
3,118,771  1/1964  Albrecht _____ 99—143

A. LOUIS MONACELL, *Primary Examiner.*

H. H. KLARE, *Assistant Examiner.*